March 26, 1946.   F. R. DENT, JR   2,397,132
ANTIFLUTTER AND VIBRATION DEVICE FOR FAN AND PROPELLER BLADES
Filed March 20, 1943   2 Sheets-Sheet 2
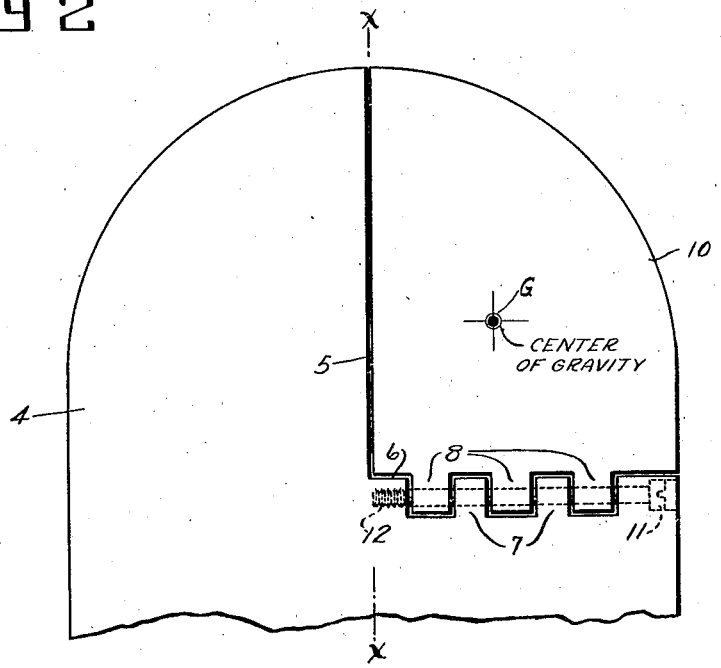
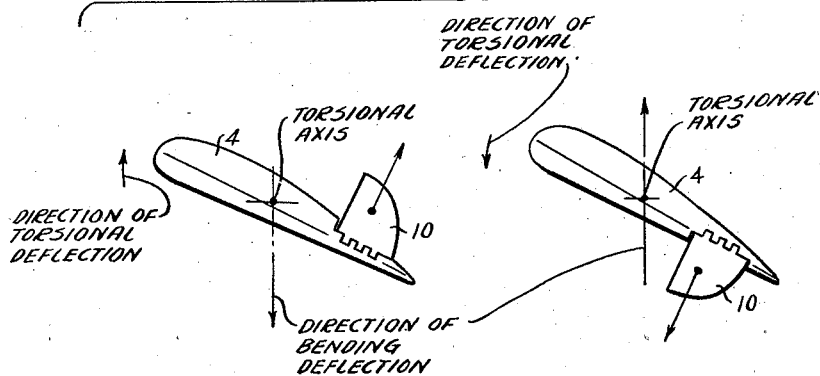
INVENTOR
FREDERICK R. DENT, JR.

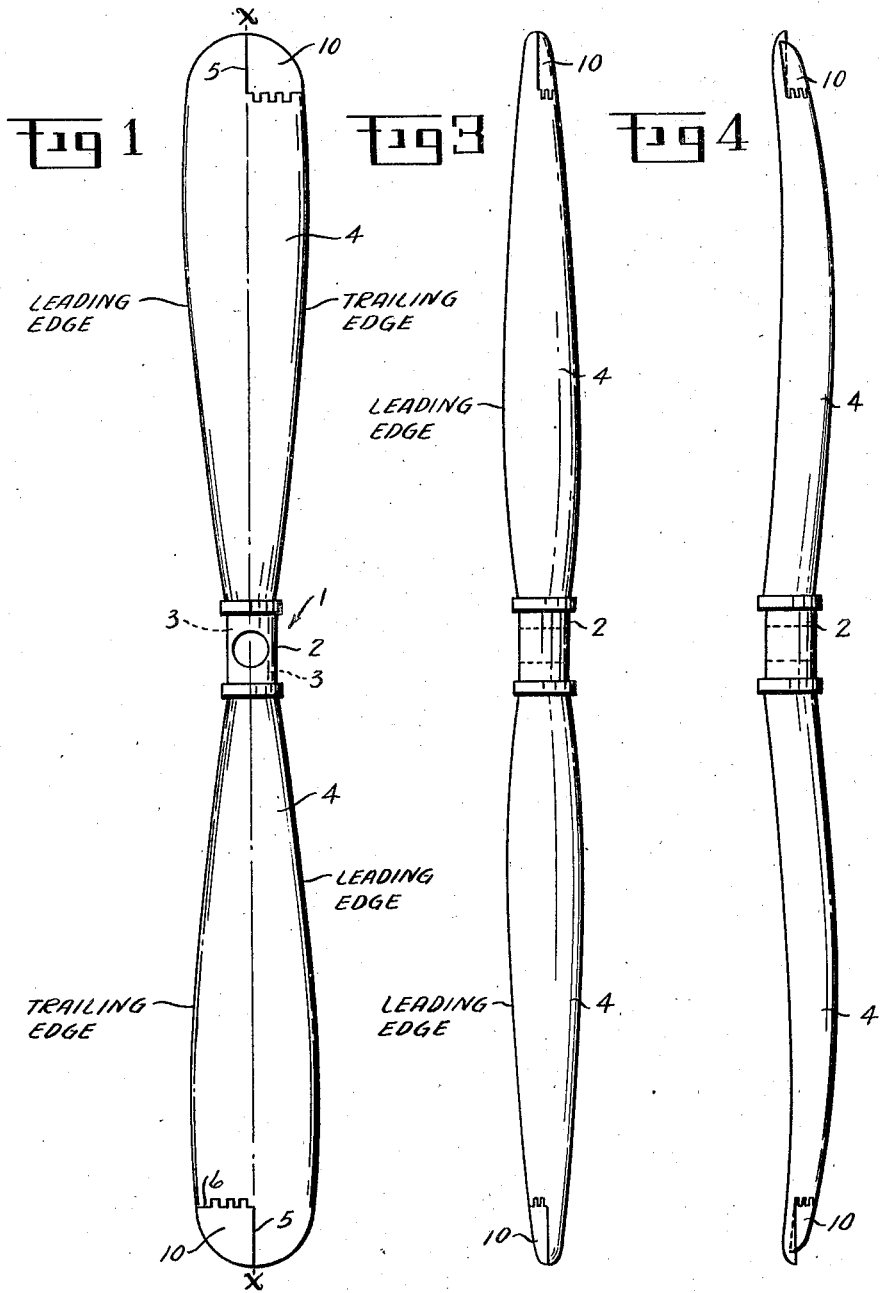

Patented Mar. 26, 1946

2,397,132

UNITED STATES PATENT OFFICE 2,397,132

ANTIFLUTTER AND VIBRATION DEVICE FOR FAN AND PROPELLER BLADES

Frederick R. Dent, Jr., Fairfield, Ohio

Application March 20, 1943, Serial No. 479,867

7 Claims. (Cl. 170—159)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to means for preventing flutter or dangerous vibration in propeller or fan blades.

In airplane propellers and large fans serious vibration and flutter difficulties frequently arise due to the fact that the driving torque, when supplied by an internal combustion engine, contains harmonic variations which result from the intermittent nature of the gas explosion pressures. Variations are also encountered when the blades of fans or propellers are working in close proximity to some obstruction, such as a wing, landing gear, or wind tunnel guide vanes, or in the wake of some obstruction. At certain speeds of rotation, the fan or propeller experiences resonant vibration from the action of these variable impulses, corresponding to the natural vibration frequency of the fan or propeller. The resonant vibrations are often dangerous since they are often productive of deflections of large amplitude, which because of high stresses thereby induced, ultimately cause failure.

When flutter and vibration conditions are encountered, it is generally sought to eliminate critical stresses, as far as possible, by increasing the blade rigidity and reducing the mass of the rotating parts so that the critical speeds may be located beyond the normal operating range. It frequently happens however that this design procedure becomes impractical or impossible and it is necessary to operate the propeller or fan through a speed range which corresponds to that of the resonant frequency of the propeller or fan, or at speeds where the forcing function corresponds to the resonant frequency of the propeller or fan blade.

It has been proposed in the propeller art to use a fluid in a hollow propeller blade in combination with a flow restricting baffle to overcome vibration by frictional damping, and frictional damping by use of lead shot has also been proposed, but such proposals have not met with favor because of the added weight involved and further the frictional damping is ineffective until the blade deflections become considerable.

Pendulum type vibration dampers are also well known and operate on the principle that for a certain critical speed the pendulum will vibrate 180° out of phase with the variable forces or forcing function tending to produce vibration and thus the pendulum opposes the forces set up by the forcing function, and by proper design can substantially eliminate any tendency of the vibrations to increase in amplitude. Pendulum dampers have been generally employed in conjunction with engine crankshafts and so far as I am aware have never been proposed for use as a part of a propeller or fan blade for damping vibration at a critical speed.

The principal object of the present invention is to provide a simple pendulum damper means adapted to reduce torsional and bending oscillations of a propeller or fan.

It is a further object of the invention to provide a pendulum type vibration damper for propellers or fans in which the damper comprises a pendulous element which conforms to the contour of the propeller blade or fan blade tip and is hinged to the blade proper by suitable means allowing freedom of oscillation either about its axis of attachment or some other appropriate axis as a simple or a compound pendulum.

It is another object of the invention to provide a vibration damper for propeller or fan blades in which the damper comprises a mass pendulously mounted on the blade and forming a portion of the contour thereof, and the mass being so positioned as to be responsive to either bending or torsional oscillations thereof.

Other objects of the invention will become apparent by reference to the detailed description thereof hereinafter given and to the appended drawings in which:

Fig. 1 is a front elevation of an aircraft propeller employing a vibration damper on each blade in accordance with the invention;

Fig. 2 is an enlarged view of the tip section of one of the blades of the propeller of Fig. 1;

Fig. 3 is a side elevation of the propeller of Fig. 1, showing the normal position of the vibration damper elements;

Fig. 4 is a view similar to Fig. 3, showing the action of the vibration damper at the critical speed of the propeller;

Fig. 5 is a diagrammatic illustration in two views, showing the action of the device in accordance with the invention in damping torsional oscillation.

Referring now to Fig. 1, the reference numeral 1 generally indicates a two blade aircraft propeller or fan having a hub 2 adapted to be mounted on a driving shaft (not shown) to be driven by any suitable source of power. The hub 2 is provided with sockets 3 into which the airfoil shaped blades 4 are secured. Adjacent the tip portions of the blades pendulously mounted masses are provided which are generally a continuation of the shape of the blade tip and hinged aft of the centerline of the respective blades and freely movable about a hinge axis generally perpendicular to the blade centerline as will now be more particularly described.

By reference to Fig. 2 it is seen that the blade 4 (Fig. 1) is cut away at its tip along a face 5 generally parallel with the longitudinal centerline of the blade and cut transversely as at 6 to the trailing edge of the blade. The transverse face 6 is formed with hinge lug portions 7 which interlock with corresponding lugs 8 on the mass 10 formed of metal and having a planform and section corresponding to the portion of the blade tip which was removed, so that when aligned with the blade, the mass 10 completes the airfoil shape of the blade tip. The mass 10 is mounted for rotation about the axis of a hinge pin 11 which passes through the hinge lugs 7 and 8 and is threaded at its inner end into the body of the blade as indicated at 12.

The mass 10 will be in the nature of a simple pendulum if made of a light metal alloy and the same weighted with a denser metal in the form of a plug such that all of the mass may be considered as concentrated at a single point, or the mass may be unitary and made of dense material such as steel, so that it would correspond to a compound pendulum. In order to determine the dimensions of the mass 10 it is necessary to know the frequency of vibration which is to be avoided, i. e., the so-called forcing function and this frequency can in some instances be calculated, or is known as a result of tests. It is thus in general possible to accurately fix the critical speed of vibration of the propeller and the value of the critical vibration frequency to be avoided, because of resonance with the natural frequency of the blade or blades. Knowing the critical speed and frequency conditions for the propeller or fan blade under question, a few trial computations will give the approximate mass and dimensions to employ to obtain either a simple or compound pendulum having the desired period of vibration at the selected critical speed, which will equal the period of the forcing function. It is necessary to keep in mind that the pendulum 10 is acted on by centrifugal force which acts as a restoring force instead of gravity and hence the period of the pendulum will vary with the square of the speed of rotation. Once the mass, moment of inertia and radius of gyration are determined, dimensions of the pendulum can be accurately determined and the pendulum may be tuned by removing or adding mass or altering the mass distribution slightly.

It will be noted in Fig. 2, that the center of gravity of the pendulum indicated by the reference character G is to the rear or towards the trailing edge from the longitudinal axis X—X of the blade 4, and it is essential that the center of gravity be so located if it is desired to suppress torsional oscillations as well as bending oscillations, for reasons later to be noted.

Operation

When the propeller or fan blade of Fig. 1 is rotated at speeds other than the critical speed, centrifugal force acting on the pendulums 10 will hold the same in alignment with the blade tips such as shown in Fig. 3, and the propeller will act in the conventional manner. As soon however as the critical vibration speed is approached the blades will ordinarily begin to vibrate and assume a position such as shown to an exaggerated degree in Fig. 4 with the blade tips deflecting back and forth. As soon as the critical speed is reached, however, the pendulums 10 will vibrate, but one hundred and eighty degrees out of phase with vibrations of the blades and thus set up forces opposing the deflection of the blade and effectively preventing the vibration from building up in amplitude. It sometimes happens that the bending vibrations of the blade at the critical frequency are also accompanied by oscillations of the blade about the torsional axis and such oscillations are also prevented or reduced because the center of mass of the pendulums 10 being behind the torsional axis, the pendulum vibrations will be out of phase with the torsional oscillations provided the pendulum is properly tuned with respect to the forcing function. The action of the pendulums in damping torsional vibration will be clear by reference to the diagrammatic illustrations in Fig. 5 in which the pendulum 10 moves in the opposite sense to the torsional deflection of the blade and hence opposes such deflection. The directions of deflection of the blade and pendulum are indicated by legends and arrows in Fig. 5, so that the action will be clear without further description.

It is to be understood that the vibration damper in accordance with the invention is intended to suppress torsional and bending deflection of a propeller or fan blade at some particular critical speed and in effect shifts the critical speed to some higher value out of the normal operating range and if two critical speeds occur within the operating speed range, separate dampers would be required for each critical speed.

In the event that oscillation in bending is the only serious problem at the critical speed, the entire tip may be formed as a pendulum with the center of mass lying in the plane of the longitudinal axis of the blade and in this case torsional oscillations would not be damped.

While the invention in its preferred form has been illustrated as comprising a pendulum shaped to form a part of the blade tip when in its neutral position, it is to be understood that the pendulum could be streamlined to reduce air resistance and hinged to the blade tip.

It is to be understood that the invention is applicable to fans as well as propellers and the term propeller as hereinafter employed in the claims is intended to embrace the application of the invention to fan blades.

Having illustrated and described my invention, it will become apparent to those skilled in the art that many modifications and changes may be made therein falling within the scope of the invention as defined by the appended claims.

I claim:

1. A vibration damper for a propeller blade having a natural period of vibration corresponding to a predetermined frequency of vibratory forces arising at a particular speed of rotation within the range of operating speeds of the propeller, comprising a pendulum freely pivotally mounted on said blade for angular movement in the plane of flexure of the blade, said pendulum being mounted adjacent the tip of the blade and having an oscillation frequency at said particular propeller speed corresponding to the predetermined frequency of said vibratory forces.

2. A flutter and vibration resistant propeller blade construction comprising a propeller blade having a cut out portion adjacent the tip section thereof and a pendulum formed as a continuation of the blade positioned in said cut out portion, and hinge means connecting the inner end of said pendulum to said blade, the hinge axis being substantially normal to the longitudinal axis of the blade, said pendulum being freely rotatable about the hinge axis and having a moment of inertia and radius of gyration such that the vibration frequency of the pendulum at a predetermined critical speed of rotation of the blade is equal to the frequency of external vibratory forces tending to cause vibration of the blade at said critical speed of rotation.

3. The structure as claimed in claim 2, in which the center of mass of said pendulum is positioned to the rear towards the trailing edge of the blade from the torsional axis of the blade.

4. An anti-flutter propeller blade construction for substantially eliminating the effect of vibration forces acting thereon comprising in combination with said blade of a cut out adjacent the blade tip along planes parallel and perpendicular respectively to the longitudinal axis of the blade, a pendulum shaped to substantially correspond to the cut out portion of said blade and to fit therein, means pivotally connecting the pendulum to the blade for free angular movement about an axis transverse to the longitudinal axis of the blade, the center of gravity of said pendulum being positioned aft of the torsional axis of the blade toward the trailing edge of the blade and the distribution of mass of said pendulum with respect to its pivotal axis being so constructed and arranged that the free period of vibration of said pendulum corresponds, at a critical speed of rotation of said blade, to the period of the vibratory forces acting thereon at the said critical speed of rotation.

5. An anti-flutter propeller blade comprising in combination with said blade of a mass pivotally mounted on said blade for free angular movement about an axis substantially normal to the longitudinal axis of the blade such that centrifugal force due to rotation of the blade is effective to create restoring forces opposing oscillation of said pendulum about its pivotal axis, said mass having its radius of gyration and center of gravity with respect to said axis such that the free period of oscillation of said mass corresponds to the resonant period of vibration of said propeller blade as a whole, the center of gravity of said mass being positioned behind the torsional axis of the blade toward the trailing edge of the blade.

6. An anti-flutter propeller blade comprising in combination with said blade of a mass pivotally mounted on said blade for free angular movement about an axis substantially normal to the longitudinal axis of the blade such that centrifugal force due to rotation of the blade is effective to create restoring forces opposing oscillation of said pendulum about its pivotal axis, said mass having its radius of gyration and center of gravity with respect to said axis such that the free period of oscillation of said mass corresponds to the resonant period of vibration of said propeller blade as a whole, said pivotally mounted mass being so shaped as to form a continuation of the contour of the blade.

7. An anti-flutter propeller blade comprising in combination with said blade of a mass pivotally mounted on said blade for free angular movement about an axis substantially normal to the longitudinal axis of the blade such that centrifugal force due to rotation of the blade is effective to create restoring forces opposing oscillation of said pendulum about its pivotal axis, said mass having its radius of gyration and center of gravity with respect to said axis such that the free period of oscillation of said mass corresponds to the resonant period of vibration of said propeller blade as a whole, and said pivotally mounted mass forming a continuation of the contour of the blade and the center of gravity of the mass being positioned aft of the torsional axis of the blade.

FREDERICK R. DENT, Jr.